United States Patent [19]

Orlich

[11] Patent Number: 5,506,640
[45] Date of Patent: Apr. 9, 1996

[54] METHOD AND APPARATUS FOR AN ALIGNMENT GRID OR PATTERN PROJECTION SYSTEM

[76] Inventor: William N. Orlich, 103 Number 3, Hogan Ct., Walnut Creek, Calif. 94598

[21] Appl. No.: 418,677

[22] Filed: Apr. 7, 1995

[51] Int. Cl.⁶ .................................................. G03B 21/00
[52] U.S. Cl. .................. 353/28; 353/44; 353/122
[58] Field of Search .................. 353/28, 40, 41, 353/44, 62, 80, 121, 122; 33/615, 616, 617, 1 G, 1 K

[56] References Cited

U.S. PATENT DOCUMENTS

| | | |
|---|---|---|
| 2,034,529 | 3/1936 | Olsen . |
| 2,083,472 | 6/1937 | Reed ........................................ 353/44 |
| 2,493,628 | 1/1950 | Harley . |
| 2,682,463 | 6/1954 | Olsen . |
| 2,772,631 | 12/1956 | Imshaug . |
| 3,067,666 | 12/1962 | Coffman . |
| 3,323,415 | 6/1967 | Tobias ...................................... 353/28 |
| 3,327,400 | 6/1967 | Barron . |
| 3,591,284 | 7/1971 | Liebman . |
| 3,605,622 | 9/1971 | Zarip . |
| 3,632,197 | 1/1972 | Shelton .................................... 353/44 |
| 3,837,740 | 9/1974 | Johnson .................................. 353/122 |
| 4,018,519 | 4/1977 | Clapp ....................................... 353/28 |
| 4,177,730 | 12/1979 | Schriber et al. . |
| 4,521,091 | 6/1985 | Theslof, Jr. ............................ 353/122 |
| 4,732,468 | 3/1988 | Wright . |
| 4,771,551 | 9/1988 | Hiroshima et al. ..................... 33/615 |
| 4,910,541 | 3/1990 | Morgan ................................... 353/28 |
| 5,052,797 | 10/1991 | Madsen ................................... 353/28 |
| 5,088,814 | 2/1992 | Campbell ................................ 353/44 |
| 5,226,366 | 7/1993 | Schlife et al. .......................... 33/617 |
| 5,331,360 | 7/1994 | Ruben et al. ........................... 353/96 |

Primary Examiner—William C. Dowling
Attorney, Agent, or Firm—Shlesinger Arkwright & Garvey

[57] ABSTRACT

An apparatus for quickly and accurately aligning a layout to be duplicated having a copy board with an upper work surface for receiving a layout to be aligned and duplicated; an alignment pattern member including an alignment pattern; a wave energy projecting member positioned adjacent the upper work surface of the copy board for projecting an image of the alignment pattern onto the upper work surface; a duplicating member positioned adjacent the upper work surface of the copy board for duplicating the image of the layout; an orienting member for orienting the projected image of the alignment pattern with the duplicating member; and a cut off member for removing the projected image of the alignment pattern from the upper work surface of the copy board prior to the operation of the duplicating member.

25 Claims, 4 Drawing Sheets

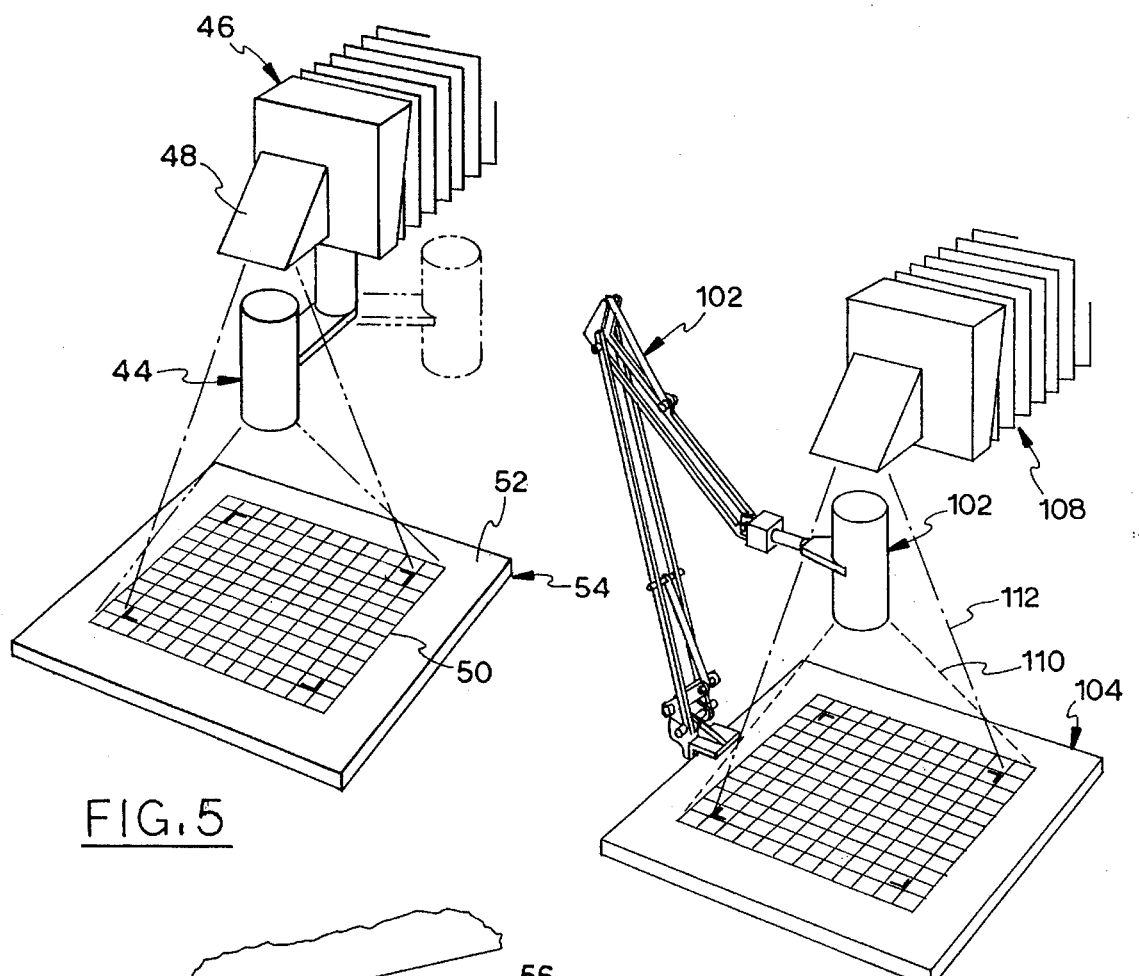
FIG. 5
FIG. 10
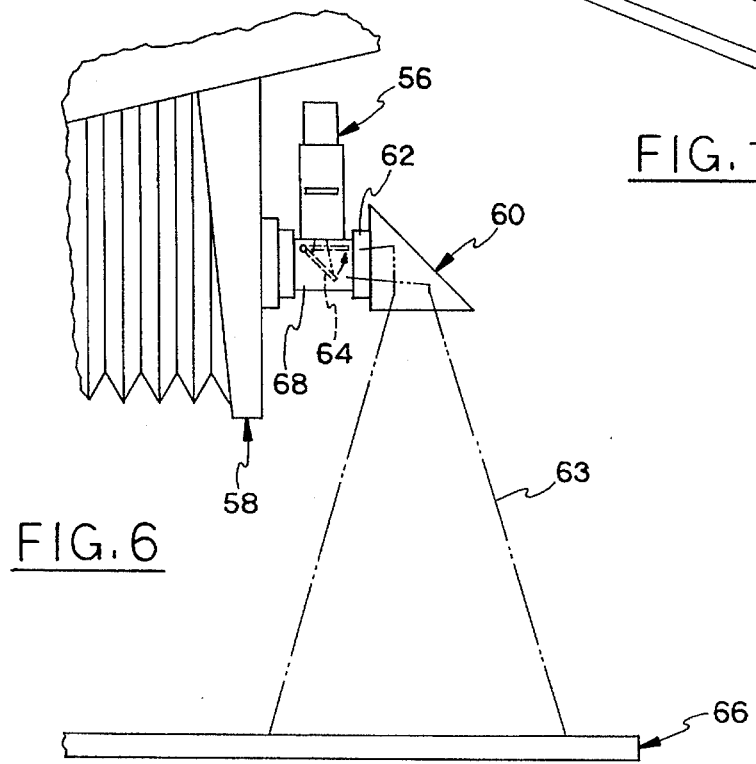
FIG. 6

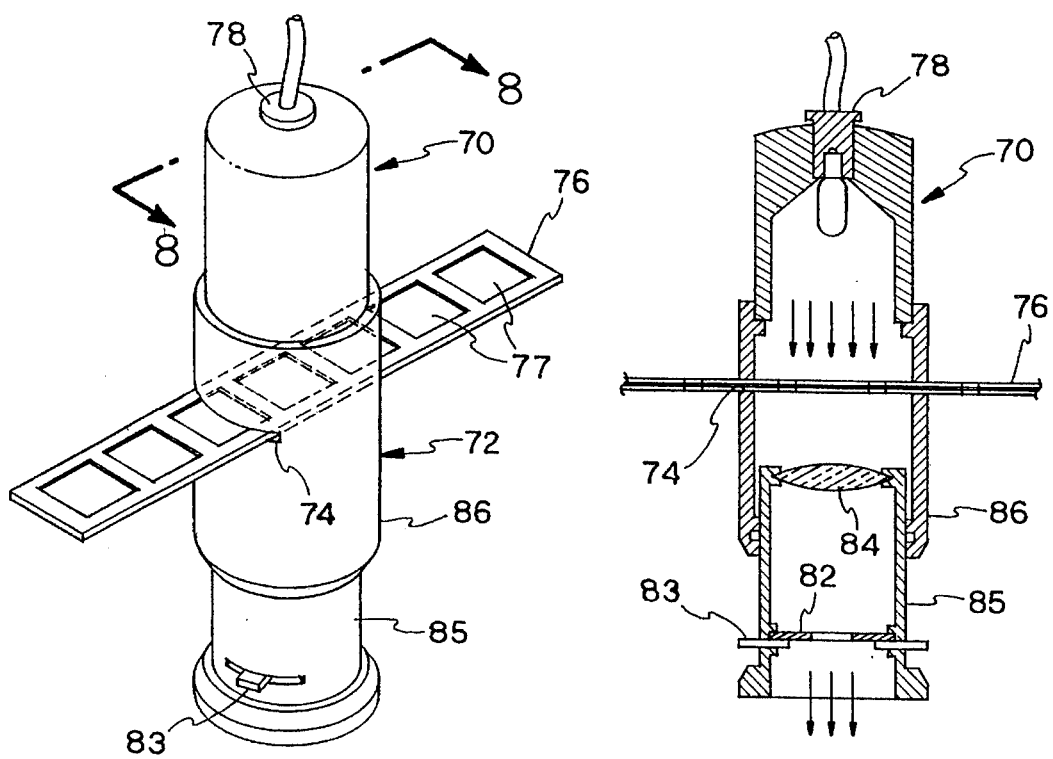
FIG. 7  FIG. 8
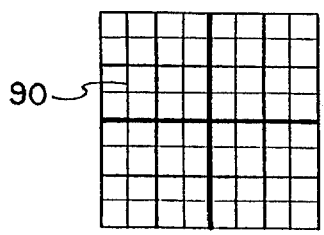
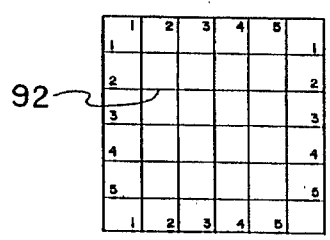
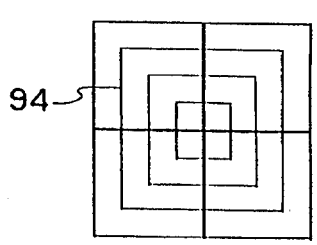
FIG. 9A  FIG. 9B  FIG. 9C
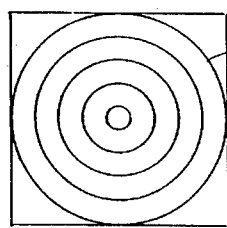
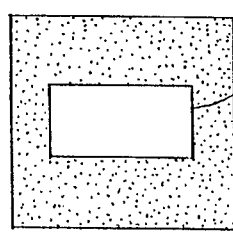
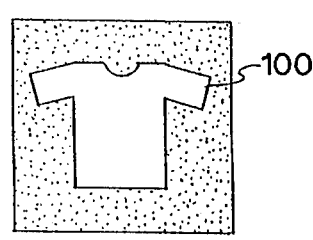
FIG. 9D  FIG. 9E  FIG. 9F

METHOD AND APPARATUS FOR AN ALIGNMENT GRID OR PATTERN PROJECTION SYSTEM

FIELD OF THE INVENTION

The present invention relates generally to a method of and device for aligning a layout which may be subsequently compared or duplicated using duplicating equipment, printing equipment or the like, and more specifically, to a method of and device for projecting an alignment pattern onto a copy board for quick and accurate alignment of the components of a layout and for alignment of the layout with respect to the duplicating medium and for duplicating the image of the layout.

BACKGROUND OF THE INVENTION

In the graphic art business, the proper alignment of a layout to be duplicated or otherwise reproduced is very important. Any misalignment of the components of the layout with respect to the orientation of the film or the photographic medium (usually a film cartridge or plate) will be ultimately repeated on all copies made.

When the components of the layout are not properly aligned, a time consuming re-shoot or alignment on the printing machine may be required to correct the misalignment. This results in higher labor cost as well as wasted film and other materials.

There are a number of alignment devices commercially available, some examples of which are disclosed in U.S. Pat. Nos. 2,682,463 (Olsen) and 3,605,622 (Zarip). Many of the commercially available alignment devices rely on some form of pattern incorporated into or on the surface of the copy board. When the layout is placed on the copy board, the alignment pattern on the copy board is covered up, forcing the operator to guess or eyeball the proper alignment of the layout. These types of alignment devices can only ensure the proper alignment of the outer edges of a layout.

The present available technique for correcting the misalignment of an image on a developed plate (where the entire image of the layout is askew) is to adjust the plate containing the image of the layout on the press and run a test printing or a series of tests until proper alignment is achieved. This trial and error procedure is very time consuming and costly to the printer.

OBJECTS AND SUMMARY OF THE INVENTION

It is therefore an object of the present invention to provide an alignment and photo duplicating device for the quick and accurate alignment of an entire layout and its components relative to each other and to the photographic medium thereby eliminating extensive reproduction time cost previously required to achieve an accurate photo duplication or reproduction of a layout.

It is another object of the present invention to provide an alignment and photo duplicating device whereby the alignment pattern is unobstructed when objects or layouts are placed onto the copy board.

It is yet another object of the present invention to provide an alignment device which projects an image of an alignment pattern utilizing wave energy, such as visible light, ultraviolet light, and infra-red light, onto a copy board.

It is still another object of the present invention to provide an alignment apparatus which utilizes a carousel or magazine type projector allowing the user to select from multiple alignment patterns.

It is yet another object of the present invention to provide a projection alignment device removably associated with a vertical duplicating camera.

It is another object of the present invention to provide a projection alignment device which is operably interconnected with a photo duplicating device whereby the alignment pattern projected onto the copy board by the projection alignment device is automatically removed or cutoff prior to the activation of the duplicating device.

It is still another object of the present invention to provide a projection alignment device which is operably interconnected with a photo duplicating device so that the projection device automatically cycles on and off in a preselected time pattern, permitting the operator to view the layout with and without the alignment pattern projected onto the copy board.

It is another object of he present invention to provide a projection alignment device and photo duplicating device with a safety apparatus which prevents the activation of the photo duplicating device without the removal of the projected alignment image.

It is yet another object of the present invention to provide a projection alignment device associated with a horizontal camera using a rotatable copy board.

It is another object of the present invention to provide a projection alignment device with alignment patterns using color schemes to enable a user to quickly position items with respect to other items with respect to the size of a layout using the color coded pattern.

It is another object of the present invention to provide a projection alignment device which can be operably attached to or connected with various types of photographic equipment.

It is yet another object of the present invention to provide a projection alignment device in which the intensity of the projected image can be varied.

It is still another object of the present invention to provide a projection alignment device with an aperture to control the intensity of the projected image.

In summary, the present invention is directed to a method of and apparatus for projecting an alignment grid onto a copy board for the proper alignment of the components layout and for duplicating the image of the layout.

BRIEF DESCRIPTIONS OF THE DRAWINGS

These and other objects, advantages and novel features of the present invention will become apparent from the following detailed description taken in consideration of the accompanying drawings, in which:

FIG. 5 is a fragmentary perspective view of still another embodiment of the present invention with a projector member pivotally connected to a camera;

FIG. 6 is a fragmentary side elevational view of yet another embodiment of the present invention with the projector integrated with the camera;

FIG. 7 is a perspective view of another embodiment of a projector member of the present invention incorporating a multiple slide carrier, a portion of which is shown in phantom lines to illustrate its position in a slot of the projector member;

FIG. 8 is a cross sectional view of a projector member taken along line 8—8 of FIG. 7 showing details of the interior of the projector member;

Figure 1:
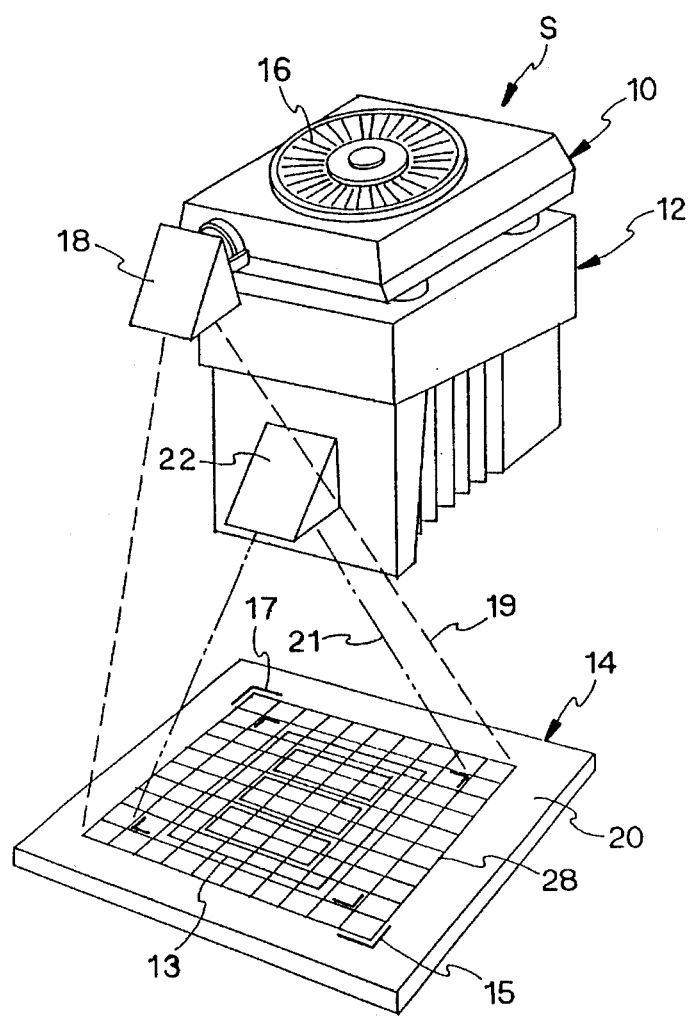
FIG. 1 is a perspective view of an embodiment of the present invention including a copy board, camera and projector positioned relative to each other but without showing details of integrated supporting equipment therefor, and showing in schematic an alignment pattern projecting onto a copy board and phantom lines showing the focal path of the camera.
Figure 2:
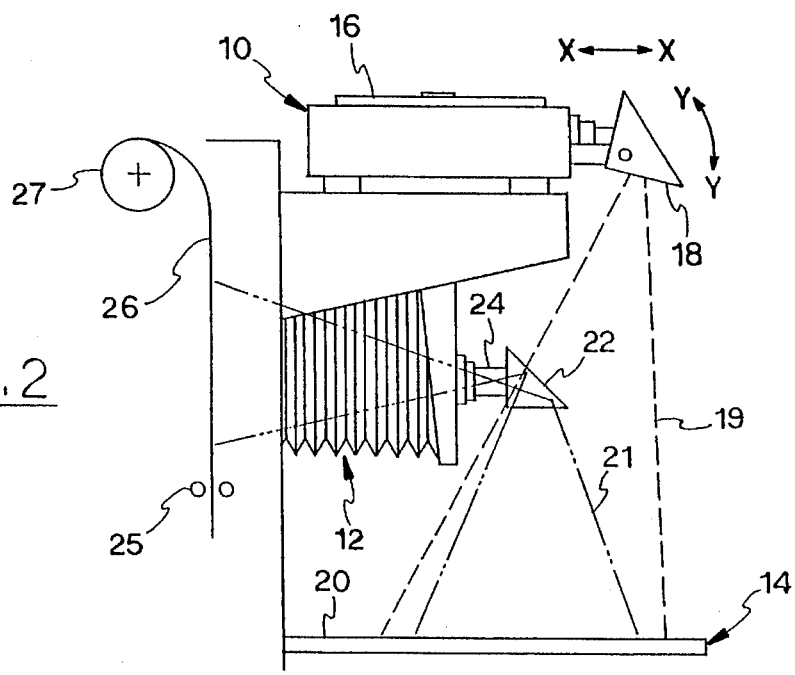
FIG. 2 is a side elevational view of the present invention, similar to FIG. 1 showing in phantom lines the projection of the alignment pattern and the focal path of the camera, and showing schematically the photographic medium.

FIGS. 9a–9f are top plan views of alignment patterns of the present invention, illustrating various configurations of patterns which can be incorporated into slides for a slide carrier as similarly shown in FIGS. 7 and 8 or for a carousel as shown in FIGS. 1 and 2; and FIG. 10 is a fragmentary perspective view of another embodiment of the present invention showing a projector movably mounted to the copy board with an adjustable mounting arm.

DETAILED DESCRIPTION OF THE INVENTION

FIGS. 1 AND 2

In the accompanying drawings, FIGS. 1 and 2 disclose an embodiment of a system S of the present invention for quickly and accurately aligning and photo duplicating a layout.

System S includes a projecting device 10, a photo duplicating device 12 and a subject holder such as a printing chase, or copy board 14 or the like. For the purpose of this invention, the term copy board includes subject holders, printing chases or the like. Projecting device 10 is removably positioned on the top photo duplicating device 12. Copy board 14 is positioned below both projecting device 10 and photo duplicating device 12.

It is contemplated to be within the scope of this invention that various types of photo duplicating devices such as video cameras or film cameras can be used.

Copy board 14 includes reference marks 15 and 17 which are used to orient the projected alignment pattern 28 onto copy board 14.

Projecting device 10 includes a magazine or carousel 16 for holding multiple alignment patterns which are to be projected upon copy board 14. Projecting device 10 also includes an adjustable prism 18 for orienting or positioning the projected image of alignment pattern 28 onto copy board 14.

Carousel 16 allows multiple alignment patterns to be inserted into projecting device 10 giving the user the option of a variety of alignment patterns to be projected onto the surface 20 of copy board 14.

The image projection path 19 of projecting device 10 should be broad enough to encompass the entire focal path 21 of photo duplicating device 12. This ensure that a layout 13 when placed within focal path 21 can be properly aligned using alignment pattern 28.

Photo duplicating device 12 is a bellow type camera with prism 22 attached to lens 24 for transmitting and focusing the image of layout 13 to be duplicated onto the photo graphic medium or film 26 as best shown in FIG. 2.

As illustrated in FIGS. 1 and 2, the position of projecting device 10, when mounted on photo duplicating device 12, can be adjusted along path X—X permitting further adjustment of the image of alignment pattern 28 projected onto the surface 20 of copy board 14.

Photographic medium or film 26 is shown as a spool type film. Rollers 25 engage film 26 to properly position film 26 with respect to the camera 12. Spool 27 is used to advance film 26 for a new shot to be taken.

Projecting device 10 and photo duplicating device 12 can be operably interconnected by signal or frequency generating equipment or mechanical linkages (not shown), so that photo duplicating device 12 will not operate until projecting device 10 is cut off either manually or automatically by the activation of photo duplicating device 12.

FIGS. 3 AND 4

Figure 3:
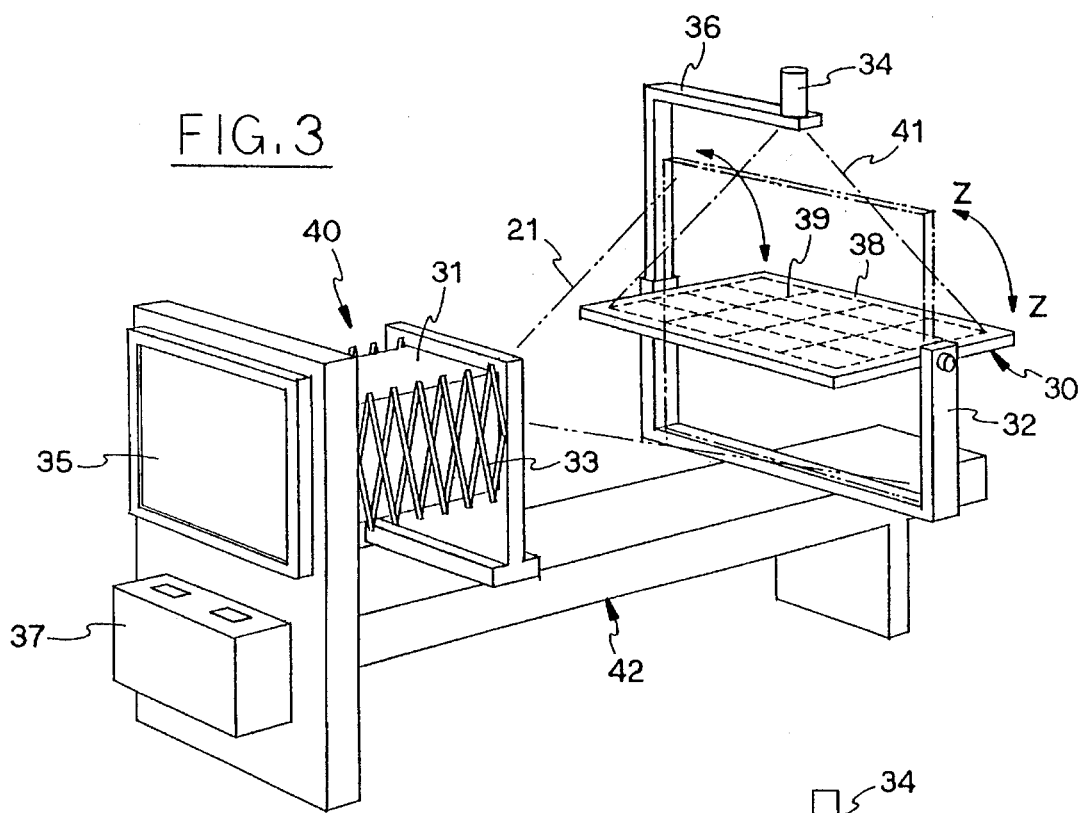
FIG. 3 is a perspective view of another embodiment of the present invention showing the copy board in a horizontal position and showing the copy board in phantom lines in a vertical position, and showing the projection of the alignment pattern and the focal path of the camera in phantom lines, and showing a camera with an accordion bracket on both sides of the camera.
Figure 4:
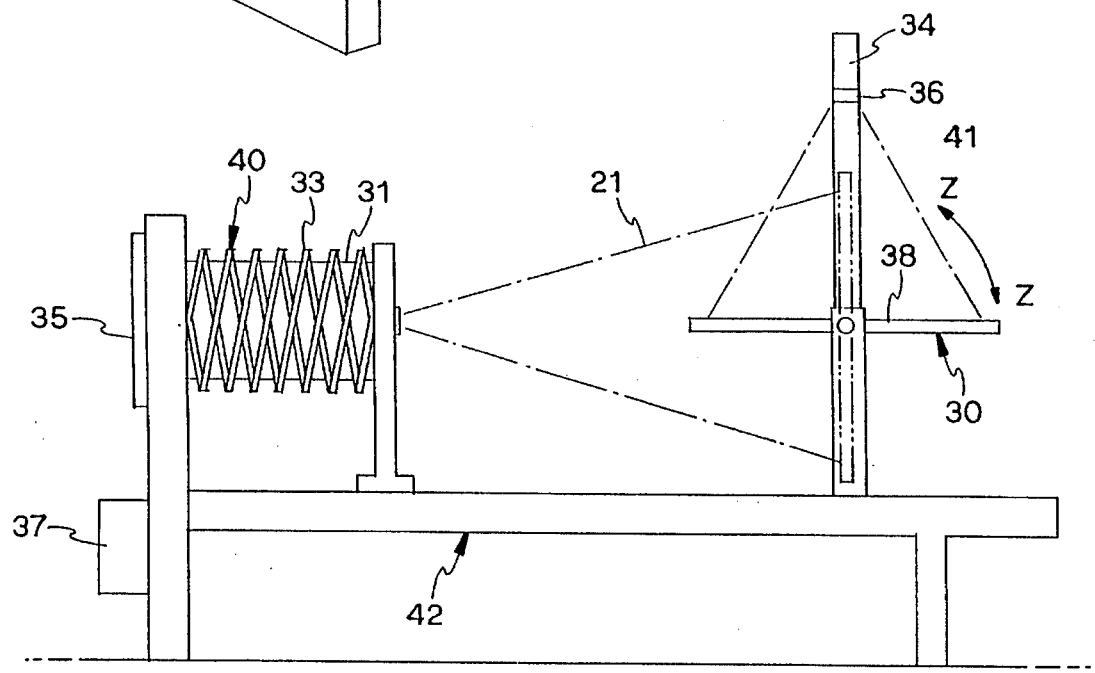
FIG. 4 is a side elevation view of the present invention, similar to FIG. 3.

FIGS. 3 and 4 illustrate another embodiment of system S. A copy board 30 is pivotally mounted to bracket 32 which allows copy board 30 to be rotated from a horizontal position along path Z—Z to a vertical position. A projecting device 34 is mounted to bracket 36 above copy board 30. When copy board 30 is in the horizontal position, projecting device 30 projects an alignment pattern onto the upper surface 38 of copy board 30.

A horizontal camera or photo duplicating device 40 is movably mounted to frame 42. A film holder 35 is mounted to one end of duplicating device 40 for receiving the photographic medium. A control unit 37 is positioned below film holder 35. Control unit 37 may incorporate a microprocessor for controlling the functions of the duplicating device 40 as well as the projection device 34.

Photo duplicating device 40 and projection device 34 can be operably interconnected by signal generating equipment or mechanical linkage (not shown).

Accordion type brackets 33 are attached to each side of photo duplicating device 40. Brackets 33 permit enlarging or reducing the copy made by the duplicating device 40 by enabling the length of photo duplicating device 40 to be varied along frame 42. Body 31 is designed to expand and collapse accordingly (not shown).

When copy board 30 is positioned in a horizontal position the alignment pattern 39 is projected along projection path 41 from projecting device 34 onto the surface 38 of copy board 30. This allows for a layout to be placed onto copy board 30 and properly aligned utilizing alignment pattern 39, before photo duplicating the image thereof.

Once aligned on copy board 30, the layout can be secured to the surface 38 of copy board 30 with adhesives or the like (not shown).

When the layout is properly aligned with alignment pattern 39, alignment pattern 39 is cut off and copy board 30 is rotated along path Z—Z to a vertical position. Photo duplicating device 40 can be adjusted for reducing or enlarging of the image of the layout by moving duplicating device 40 along frame 42 until the proper enlargement or reduction is achieved.

Once the layout is properly positioned the photo duplicating device 40 is activated with control unit 37 and the image of the layout is photo duplicated.

FIG. 5

FIG. 5 illustrates another embodiment of the present invention with a projecting device 44 pivotally mounted to photo duplicating device 46. Projecting device 44 can be rotated to be into alignment with prism 48 of photo duplicating device 46 and into alignment with copy board 54. This allows the projection of the alignment pattern 50 onto surface 52 of copy board 54.

When the layout to be duplicated has been properly aligned using alignment pattern 50, alignment pattern 50 is cut off and projector device 44 is rotated out of the way of prism 48 of photo duplicating device 46. This prevents the image of the alignment pattern 50 from being inadvertently duplicated with the image of the layout.

FIG. 6

FIG. 6 illustrates another embodiment of the present invention. A projecting device 56 is integrated with a photo duplicating device 58. projecting device 56 is positioned intermediate lens 62 and photo duplicating device 58.

A prism or mirror 64 is used to project the image of an alignment pattern from projecting device 56 through lens 62 and prism 60 along projection path 63 and onto copy board 66.

Mirror 64 is pivotally mounted within the neck portion 68 of photo duplicating device 58 so that when the image of the layout is to be duplicated, mirror 64 can pivot up towards projecting device 56 out of the way of the image to be photo duplicated.

Projecting device 56 and photo duplicating device 58 are operably interconnected so that when photo duplicating device 58 is activated, mirror 64 automatically pivots upwards and projecting device 56 is cut off.

FIGS. 7 AND 8

FIGS. 7 and 8 illustrate an alternative embodiment of a projecting device 70 of the present invention. Projecting device 70 includes a generally tubular or elongated housing 72. A slot 74 extends through housing 72 for receiving a slide cartridge 76 of alignment pattern slides 77.

Projecting device 70 further includes a light source 78 positioned within housing 72 at end 80 of projecting device 70. A variable aperture 82, used to adjust the intensity of projected image, is positioned within housing 72 intermediate light source 78 and slot 74. A lens or focusing device 84 is positioned within lens holder 85. Lens holder 85 is movably positioned within housing 72 at end 86 opposite of light source 78.

FIGS. 9a–9f

FIGS. 9a through 9f illustrate embodiments of alignment patterns which can be incorporated into slides for carousel type projectors (FIG. 1 and 2) or into slide cartridge for a tubular type projector (FIG. 7 and 8).

FIG. 9a shows a typical rectangular grid pattern 90. FIG. 9b shows a rectangular grid pattern 92 with a numbered matrix for quick position reference. FIG. 9c shows a concentric rectangular grid pattern 94. FIG. 9d shows a concentric circular grid pattern 96. FIG. 9e shows a single rectangular grid pattern 98. FIG. 9f shows a pattern having non-standard geometric shapes 100 such as a T-shirt.

While only six patterns are shown in FIGS. 9a–9f, it is contemplated to be within the scope of this invention that any type of pattern can be used. It is further contemplated to be within the scope of the invention that the actual patterns can be color coded creating additional patterns within the main pattern. This has been found to be particularly advantageous for the quick alignment of various types of layouts.

FIG. 10

Referring now to FIG. 10, another embodiment of the present invention is shown. A projecting member 102 is movably mounted to copy board 104 with mounting device 106. Mounting device 106 is adapted to adjust in all three dimensions to permit the adjustment and positioning of projecting device 102 to be in alignment with photo duplicating member 108. This also ensures that the focal path 112 of photo duplicating member 108 be within the projection path 110 of projecting device 102.

Using mounting device 106 and the like to hold projecting member 102 permits the installation and use of the present invention with many types of existing photo duplicating systems.

OPERATION

FIGS. 1 AND 2

Referring now to FIGS. 1 and 2, in operation alignment pattern members are inserted into carousel 16. A desired alignment pattern member is then selected and projected onto copy board 14. Alignment pattern 28 is then aligned with reference marks 15 and 17 on the surface 20 of copy board 14. This is done by adjusting prism 18 along path Y—Y and adjusting the position of projection device 10 along path X—X.

Once the image of alignment pattern 28 has been aligned, the layout is then placed on surface 20 of copy board 14 and then is properly aligned with alignment pattern 28.

Once the layout has been-properly aligned, alignment pattern 28 is removed from copy board 14 by shutting off projecting device 10. The image of the layout is then focused with photo duplicating device 12 and then an image of the layout is recorded on film 26.

FIGS. 3 AND 4

Referring to FIGS. 3 and 4, copy board 30 is rotated into a horizontal position along path Z—Z. An alignment pattern 39 is chosen and inserted into projecting device 34 and is projected onto upper surface 38 of copy board 30. A layout is then placed on upper surface 38 and oriented with the alignment pattern.

Once properly oriented the layout is then secured to the upper surface 38 of copy board 30 using adhesives or the like (not shown). The image of the alignment pattern is then removed by turning off projecting device 34.

Copy board 30 is then rotated along pat Z—Z to a vertical position. The image of the layout can be properly enlarged or reduced by moving camera 40 along frame 42. Once positioned, the film is inserted into film holder 35. The image is then duplicated onto the film.

FIG. 5

Referring now to FIG. 5, projecting device is rotated to be in alignment with prism 48 and copy board 54. An alignment pattern 50 is selected and projected onto surface 52 of copy board 54. The layout is then placed upon upper surface 52 of copy board 54 and properly aligned using alignment pattern 50.

After the layout has been aligned with alignment pattern 50, alignment pattern 50 is removed by turning off projecting device 44. Projecting device 44 is then rotated from underneath prism 48 and out of alignment with prism 48 and copy board 54. The image of the layout is then focused using photo duplicating device 46. Once properly focused the image is then photo duplicated.

FIG. 6

Referring now to FIG. 6, an alignment pattern image is projected from projecting device 56 to copy board 66. The projected image exits projecting device 56 into neck 68 of photo duplicating device 58 striking mirror 64. The image is then directed into prism 60 and directed down to copy board 66.

A layout is placed on copy board and is then properly aligned using the projected alignment pattern. Once the layout has been aligned, the image of the layout is photo duplicated by device 58.

When the image of the layout is properly aligned, the photo duplicating device 58 is activated. When the photo duplicating device is activated, projecting device 56 is automatically turned off and mirror 64 automatically pivots up towards projecting device 56 into a horizontal position. This permits an unobstructed image of the layout to be duplicated.

FIGS. 7 AND 8

Referring to FIGS. 7 and 8, projecting device 70 is activated by turning on light source 78. Slide holder 76 is inserted into slot 74 and adjusted so that the desired alignment pattern slide 77 is positioned under light 78.

The image of alignment pattern slide 77 is focused by adjusting the position of lens holder 85 which adjusts the position of lens 84.

The intensity of the projected image is varied by opening or closing aperture 76, thereby increasing or decreasing the amount of light passing through alignment pattern slide 77.

While this invention has been described as having a preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. Duplicating apparatus for quickly and accurately aligning a layout to be duplicated including:
   a) duplicating means;
   b) a copy board having an upper work surface for receiving a layout to be aligned and duplicated;
   c) an alignment pattern support member including an alignment pattern;
   d) means positioned adjacent said upper work surface of said copy board for projecting a wave energy image of said alignment pattern onto said upper work surface so as to encompass the layout to be duplicated;
   e) said duplicating means including means positioned adjacent said upper work surface of said copy board for duplicating the image of the layout;
   f) means for orienting said image of said alignment pattern with said duplicating means; and
   g) means for cutting off said wave energy image of said alignment pattern from said upper work surface prior to the operation of said duplicating means so that once the layout has been aligned, duplication of the layout can be made without incorporating therein said image of said alignment pattern.

2. Duplicating apparatus as in claim 1, wherein:
   a) said duplicating means includes a camera.

3. Duplicating apparatus as in claim 1, wherein:
   a) said orienting means includes a reference member on said upper work surface of said copy board.

4. Duplicating apparatus as in claim 1, wherein:
   a) said projecting means is pivotally mounted below said duplicating means.

5. Duplicating apparatus as in claim 1, wherein:
   a) said projecting means is adapted to receive a plurality of alignment pattern members each including an alignment pattern.

6. Duplicating apparatus as in claim 1, wherein:
   a) said projecting means includes means for adjusting the intensity of said wave energy image of said alignment pattern.

7. Duplicating apparatus as in claim 6, wherein:
   a) said adjusting means includes a variable aperture.

8. Duplicating apparatus as in claim 7, wherein:
   a) said projecting means includes a visible light projector.

9. Duplicating apparatus as in claim 8, wherein:
   a) said light projector is integrated with said duplicating means.

10. Duplicating apparatus as in claim 1, and including:
    a) means interconnecting said projecting means with said duplicating means for causing said projecting means to be nonfunctional when said duplicating means is operating.

11. Duplicating apparatus as in claim 1, wherein:
    a) said cut off means is operably interconnected with said duplicating means.

12. Duplicating apparatus as in claim 1 and including:
    a) means for rotating said copy board from a first alignment position to a second duplicating position.

13. Duplicating apparatus as in claim 12 in wherein:
    a) said copy board first alignment position is angularly disposed from said second duplicating position.

14. Duplicating apparatus as in claim 13 and wherein:
    a) the angular disposition of said first alignment position of said copy board is about 90° from said second duplicating position.

15. Duplicating apparatus as in claim 13, wherein:
    a) said duplicating means includes a camera.

16. Duplication apparatus as in claim 12, and wherein:
    a) said copy board includes a reference member on said upper surface.

17. Alignment apparatus for use with duplicating apparatus for quickly and accurately aligning a layout to be duplicated including:

a) a copy board having an upper work surface for receiving a layout to be aligned and duplicated;

b) an alignment pattern member including an alignment pattern;

c) projecting means positionable above said copy board upper work surface for receiving an alignment pattern member and associated with said copy board for projecting a wave energy image of said alignment pattern onto said upper work surface;

d) means for interconnecting said alignment apparatus to said duplicating apparatus; and e) means for turning on said projecting means for alignment of a layout and for turning off said projecting means prior to operation of said duplicating apparatus.

18. Alignment apparatus as in claim 17 and including:

a) means for operating said duplicating apparatus only when said projecting means is turned off.

19. Alignment apparatus as in claim 17 and wherein:

a) said projecting means include variable aperture means.

20. Alignment apparatus as in claim 18 and wherein:

a) said projecting means is a visible light projector.

21. A method for quickly and accurately aligning and duplicating a layout, comprising the steps of:

a) providing a copy board having an upper work surface;

b) providing a wave energy image projector member positioned adjacent the upper work surface of the copy board for projecting a wave energy image onto the upper work surface;

c) providing an image duplicating member positioned adjacent the upper work surface of the copy board for photo duplicating the image of the layout;

d) projecting a wave energy image of an alignment pattern onto the upper work surface of a copy board;

e) orienting the image of the alignment pattern with the duplicating member;

f) placing a layout to be duplicated onto the upper work surface of a copy board and within the image of the alignment pattern;

g) aligning the layout with the image of the alignment pattern;

h) removing the image of the alignment pattern from the upper work surface; and i) duplicating the aligned layout.

22. The method as recited in claim 21, further comprising the steps of:

a) providing a system incorporated with the wave energy image projector for automatically selecting from a plurality of alignment patterns the alignment pattern to be projected.

23. The method as recited in claim 21, further comprising the steps of:

a) providing an alignment pattern with a color coded layout pattern.

24. Duplicating apparatus as in claim 10 and including:

a ) microprocessing means interconnecting said projecting means and with said duplicating means.

25. A method for quickly and accurately aligning a layout, comprising the steps of:

a) providing a copy board having an upper work surface;

b) providing a wave energy image projector member positioned adjacent the upper work surface of the copy board for projecting a wave energy image onto the upper work surface;

c) providing an image duplicating member positioned adjacent the upper work surface of the copy board for duplicating the image of the layout;

d) projecting a wave energy image of an alignment pattern onto the upper work surface of a copy board;

e) orienting the image of the alignment pattern with the duplicating member;

f) placing a layout to be duplicated onto the upper work surface of a copy board and within the image of the alignment pattern;

g) aligning the layout with the image of the alignment pattern;

h) removing the image of the alignment pattern from the upper work surface.

* * * * *